Figure 1:
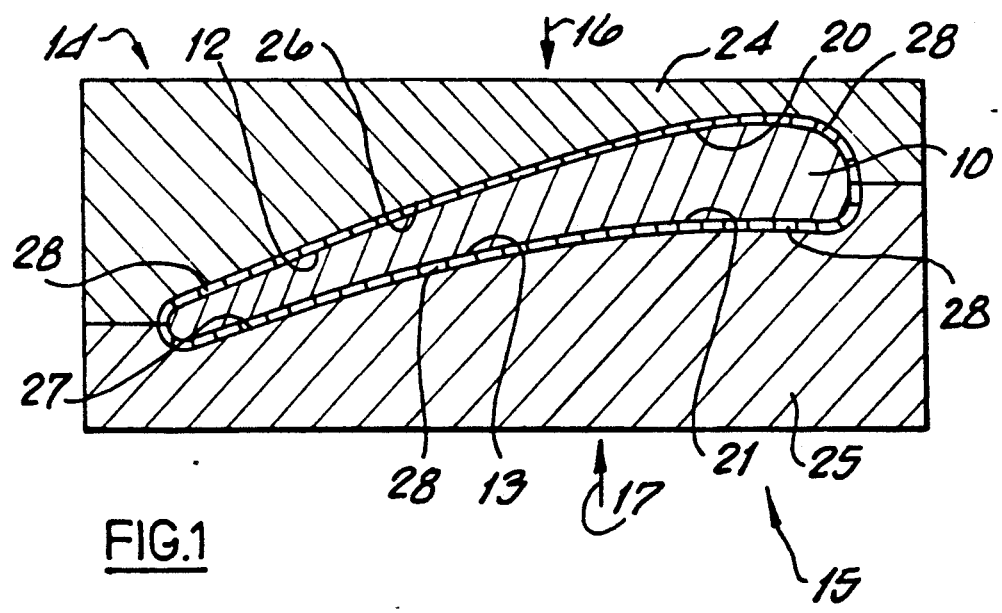

United States Patent [19]
Dawson

[11] Patent Number: 5,193,311
[45] Date of Patent: Mar. 16, 1993

[54] TOOLS FOR WORKING NON-METALLIC HARD MATERIALS

[75] Inventor: Derek J. Dawson, Shipley, United Kingdom

[73] Assignee: T&N Technology Limited, Warwickshire, England

[21] Appl. No.: 845,002

[22] Filed: Mar. 3, 1992

Related U.S. Application Data

[63] Continuation of Ser. No. 539,156, Jun. 18, 1990, abandoned.

[30] Foreign Application Priority Data

Jun. 24, 1989 [GB] United Kingdom ............... 8914567

[51] Int. Cl.⁵ .................................... B24B 19/00
[52] U.S. Cl. ................. 51/59 SS; 51/295; 51/307
[58] Field of Search ............... 51/5 D, 59 SS, 206 R, 51/206 NF, 206 P, 209 R, 281 R, 317, 325, 307, 308, 309, 295

[56] References Cited

U.S. PATENT DOCUMENTS 3,898,772  8/1975  Sawluk ...................... 51/206 P
4,164,102  8/1979  Lohrum et al. ............ 51/59 SS X
4,173,614 11/1979  Lee et al. ..................... 264/332
5,010,043  4/1991  Ringwood ................... 51/307 X

FOREIGN PATENT DOCUMENTS 0056596  1/1982  European Pat. Off. .
206098   1/1984  Fed. Rep. of Germany .
561585   5/1975  Switzerland .
1049250 11/1966  United Kingdom .
1188025  4/1970  United Kingdom .
1307713  2/1973  United Kingdom .

Primary Examiner—D. S. Meislin
Attorney, Agent, or Firm—Nixon & Vanderhye

[57] ABSTRACT

A tool (14,15) for use in working a surface of a non-metallic material having a Vickers hardness value up to 5000 is made up of a layer of platelets (28). The platelets form a working surface (20,21) which is complementary to the required shape. The platelets (28) adjoin one another and present a substantially continuous surface. Each platelet is made of a composite material having a composition comprising silicon carbide, and a material selected from the group comprising gemstone powder, and synthetic diamond powder.

6 Claims, 1 Drawing Sheet

TOOLS FOR WORKING NON-METALLIC HARD MATERIALS

This is a continuation of application Ser. No. 07/539,156, filed Jun. 18, 1990, now abandoned.

This invention relates to tools of the type used in working a surface of a non-metallic material having a Vickers hardness value up to 5000, to a required three-dimensional shape, with abrasive slurry between the tool and the surface so that the shape of the tool tools each to cause the slurry to disintegrate the surface of the material being worked.

The term non-metallic is employed in this specification and the accompanying claims to refer to any composition not comprising a metallic element, or an alloy of metallic elements, but, possibly, having a least some of the properties associated with a metallic element, or an alloy of metallic elements, and possibly comprising particles of a non-metallic material embedded in a metal matrix.

It is known to have tools of this type which have a working surface formed from gemstone particles, or synthetic diamond particles set individually on a suitable substrate. The required shape for such a working surface of a tool is provided precisely by grinding the surface with a gemstone, or synthetic diamond, in a laborious process.

It is also known to provide blocks of a composite having a composition including approximately 80% by weight of gemstone powder, or synthetic diamond powder, together with approximately 20% by weight of silicon carbide. Such a composite material has a Vickers hardness value of substantially 8000. The composite has the advantage of being readily shaped by employing conventional spark erosion techniques.

It is an object of the present invention to provide tools each of a novel and advantageous form, and capable of working satisfactorily, by disintegrating the surfaces of non-metallic materials having a Vickers hardness value up to 5000. A tool in accordance with the present invention may have a working surface of any required shape, the working surface possibly being capable of being formed by employing spark erosion techniques on a structure of the composite. In this respect the tool differs from that having a known form of working surface, provided by diamonds set substantially into the required shape, and which known working surface is incapable of being formed precisely, and conveniently, by spark erosion.

This invention provides a tool of the type used for determining the action of abrasive slurry on a surface of a non-metallic workpiece having a Vickers Hardness value up to 5000 to work the surface to a required three-dimensional shape, the tool having an irregular working surface which is formed by a layer of platelets of composite material mounted on a supporting substrate, the platelets adjoining one another and being shaped to give a substantially continuous working surface which is the inverse of the required three-dimensional shape, the composite material being a composition comprising silicon carbide, and a material selected from the group comprising gemstone powder and synthetic diamond powder.

The composite may have a composition including:- approximately 80% by weight of gemstone powder, or synthetic diamond powder, and approximately 20% by weight of silicon carbide.

The material of the workpiece on which a tool in accordance with the present invention is to work provides a surface to be worked which is capable of disintegration, by the removal of small particles from the surface.

The invention enables a tool to be provided which has a working surface of a more extensive area than conveniently can be provided by a unitary structure of the composite.

Possibly, the platelets have, at least initially, before being shaped to form the required working surface, a substantially uniform thickness. Thus, the surface of the substrate, to which the layer of platelets of the composite is secured, may be at least substantially parallel to the working surface provided by the platelets.

At least one other layer of platelets of the composite may be supported on the layer of the platelets secured to the substrate. Each such subsequent layer of platelets may not completely cover the layer of platelets provided immediately before said subsequent layer.

It is required that the constituent platelets of the, or each, layer abut against each other without any gaps being left therebetween. Thus, especially if the required working surface of the tool, and possibly the surface on which a layer of platelets of the composite is to be provided, say the appropriate substrate surface, has an irregular, non-planar form, constituent platelets of the layer may have a shape in plan determined by employing computer-aided-design techniques and from a knowledge of the shape of the surface on which the layer of platelets is to be provided.

In one form of operation of the tool, it may be arranged to vibrate at ultrasonic frequencies, and between the surface of the non-metallic material being worked, and the working surface of the tool, is provided a slurry containing particles of a Vickers hardness value intermediate between that of the non-metallic material, and that of the composite. Thus, the slurry may contain particles of boron carbide. In any such arrangement the tool works on the non-metallic material in an indirect manner.

The present invention will now be described by way of example with reference to the accompanying drawing which is a section of a tool, in accordance with the present invention, to work a material by employing ultrasonic techniques, to form a turbine blade.

A turbine blade 10, shown in the drawing, and of sintered silicon nitride, has two major surfaces 12 and 13. The sintered nitride has a Vickers hardness value of approximately 2000. The blade is obtained by working simultaneously two major surfaces of a blank by a tool comprising two complementary parts 14 and 15, and by employing known ultrasonic techniques. In the drawing, the turbine blade 10 is shown when completed, and the two complementary tool parts 14 and 15 each, in effect, comprising a tool, are contiguous. During the working operation, the two tool parts 14 and 15 are separated, but move towards each other as the turbine blade 10 is formed therebetween, and as indicated by arrows 16 and 17. The working surface 20 or 21, respectively, of the tool part 14 and 15, has an irregular, non-planar form having the inverse of the shape of one of the two major surfaces, respectively 12 and 13, of the turbine blade 10.

In accordance with the present invention, the working surfaces 20 and 21 of the tool parts 14 and 15 are provided by a composite of a composition including gemstone powder, or synthetic diamond powder and silicon carbide. In particular, the composite has a composition including: approximately 80% by weight of the gemstone, or synthetic diamond, powder and approximately 20% by weight of silicon carbide.

The composite has a Vickers hardness value of substantially 8000.

The composite structures providing the working surfaces 20 and 21 are supported by members, respectively 24 and 25, of steel and, in particular, by surfaces, respectively 26 and 27, of the members substantially parallel to the working surfaces.

The composite is initially in the form of a block, and in order to cover the relatively extensive areas of the surfaces 26 and 27 of the steel members 24 and 25, the block is sliced into platelets 28, each approximately of the same thickness in the range 1 to 5 millimetres. It is required that the platelets are secured to the surfaces 26 and 27 so that no gaps are left therebetween. Because of the irregular, non-planar forms of the working surfaces 20 and 21, and of the surfaces 26 and 27, the required shapes in plan of the platelets 28 are determined by employing conventional computer-aided-design (CAD) techniques, and the platelets may be machined to the required shapes in plan by employing conventional computer-aided-manufacturing (CAM) techniques. When the platelets 28 of the required shapes are obtained they are secured to the member surfaces 26 and 27 in any convenient way, for example, by employing a suitable adhesive, such as that sold under the name Epron 400 by BP, or by brazing.

Finally, the required working surfaces 20 and 21 of the tool parts 14 and 15, are formed by employing known spark erosion techniques, and, in particular, spark electrodes having surfaces precisely the inverse of the forms of the required working surfaces.

The tool parts 14 and 15 are mounted on the sonotrodes of known ultrasonic apparatus, not shown, and are vibrated at an ultrasonic frequency in directions transverse to the arrows 16 and 17. Desirably the frequency at which the tool parts 14 and 15 are vibrated is varied during the working operation, there being different optimum frequencies at different stages of the working operation.

A slurry containing boron carbide particles, with a Vickers hardness value intermediate between that of the composite, and of the blank from which the blade 10 is formed, is pumped between the blank and the working surfaces 20 and 21 of the tool parts 14 and 15. Because of the ultrasonic vibration of the tool parts, the boron carbide particles cause the disintegration of the surfaces of the sintered silicon nitride blank to be worked.

Periodically, the tools are displaced transiently from the surfaces being worked, so as to ensure the presence of fresh slurry therebetween, and to enable the removal of debris.

Because the working surfaces 20 and 21 of the tool parts 14 and 15 are provided by the composite there is negligible wear of these surfaces in the formation of the turbine blade 10. It can be considered that the tool parts work only indirectly on the blank.

During the ultrasonic action, the tool parts 14 and 15, move progressively and respectively in the direction of the arrows 16 and 17, as the blank is worked, and until the required turbine blade 10 is completed.

The surfaces 12 and 13 of the completed turbine blade 10 may be in a finished form after the working operation, if boron carbide particles of the appropriate sizes in this respect are included in the slurry.

It is not essential that the platelets 28 providing the working surfaces 20 and 21 of the tools have a uniform thickness.

If the working surfaces of the tools have forms which are difficult to provide, it may be desirable to have at least one layer of platelets secured to the layer of platelets secured to the steel members 24 and 25. Each subsequent layer of platelets may be formed by employing CAD, and possibly CAM, techniques. Each subsequent layer of platelets, especially after the required working surfaces are formed, by employing spark erosion techniques, may not completely cover the layer of platelets to which it is secured.

The non-unitary structure or structures of the composite, providing the working surface or surfaces of the tool, may have any desired form.

A tool according to the invention may be used in other than ultrasonic techniques.

Spark erosion techniques may be employed to correct for any uneven wear of the working surface of a tool in accordance with the present invention, after an extensive period of use.

Alternatively the working surface of such a tool having a shape no longer required, conveniently, can be formed into a newly required shape by employing spark erosion techniques.

Other techniques than spark erosion techniques, may be employed to form the working surface of a tool in accordance with the present invention.

A tool in accordance with the present invention may be employed to smooth, or finish, a surface rough-finished by a tool having a working surface provided by a metal.

Materials on which a tool in accordance with the present invention is to work, in addition to those referred to above, include silicon carbide, and tungsten carbide.

I claim:

1. A tool of the type used for determining the action of an abrasive slurry on a surface of a non-metallic workpiece having a Vickers Hardness value up to 5000 to work said surface to a required three-dimensional shape, the tool having an irregular working surface which is formed by a layer of platelets of composite material mounted on a supporting substrate, the platelets adjoining one another and being shaped to give a substantially continuous working surface which is the inverse of the required three-dimensional shape, the composite material being a composition comprising silicon carbide, and a material selected from the group comprising gemstone powder and synthetic diamond powder.

2. A tool as claimed in claim 1, wherein the composite has a composition comprising approximately 20% by weight of silicon carbide and approximately 80% by weight of the material selected from the group consisting gemstone, and synthetic diamond powder.

3. A tool as claimed in claim 1, wherein the supporting substrate has a surface on which the platelets are mounted which is the inverse of said required three-dimensional shape.

4. A tool of the type used for simultaneously determining the action of an abrasive slurry on two surfaces of a non-metallic workpiece having a Vickers Hardness value up to 5000 to work said surface to required three-dimensional shapes, the tool comprising two contiguous parts each having an irregular working surface which is formed by a layer of platelets of composite material mounted on a supporting substrate, the platelets of each tool part adjoining one another and being shaped to give a substantially continuous working surface which is the inverse of the required three-dimensional shape of one of the surfaces of the workpiece, the composite material having a composition comprising silicon carbide, and a material selected from the group comprising gemstone powder and synthetic diamond powder.

5. A tool as claimed in claim 4, wherein the composite has a composition comprising approximately 20% by weight of silicon carbide and approximately 80% by weight of the material selected from the group comprising gemstone, and synthetic diamond powder.

6. A tool as claimed in claim 4, wherein the supporting substrate of each tool part has a surface on which the platelets are mounted which is the inverse of the required three-dimensional shape of one of the surfaces of the workpiece.

* * * * *